May 16, 1933.  F. H. RAGAN  1,908,789
SWIVEL JOINT

Filed Oct. 31, 1928

INVENTOR.
Frederick H. Ragan
BY
Fay, Oberlin & Fay
ATTORNEYS.

Patented May 16, 1933

1,908,789

UNITED STATES PATENT OFFICE

FREDERICK H. RAGAN, OF SHAKER HEIGHTS, OHIO, ASSIGNOR TO THE COLUMBIA AXLE COMPANY, OF CLEVELAND, OHIO, A CORPORATION OF OHIO

SWIVEL JOINT

Application filed October 31, 1928. Serial No. 316,250.

The present invention relates as indicated to a swivel joint, and more particularly to a swivel joint adapted for more or less universal movement and comprising a socket member having a bore formed in the base of said socket and a member to be connected to said socketed member and having a projection adapted to extend through said bore and into the socket. The said projection is of less cross-section than the bore and one of the objects of the present invention is to provide means for preventing the entrance of foreign matter into the socket through said bore. Further objects of the invention will appear as the description proceeds. To the accomplishment of the foregoing and related ends, said invention, then, consists of the means hereinafter fully described and particularly pointed out in the claim.

The annexed drawing and the following description set forth in detail certain mechanism embodying the invention, such disclosed means constituting, however, but one of various mechanical forms in which the principle of the invention may be used.

Figure 1:
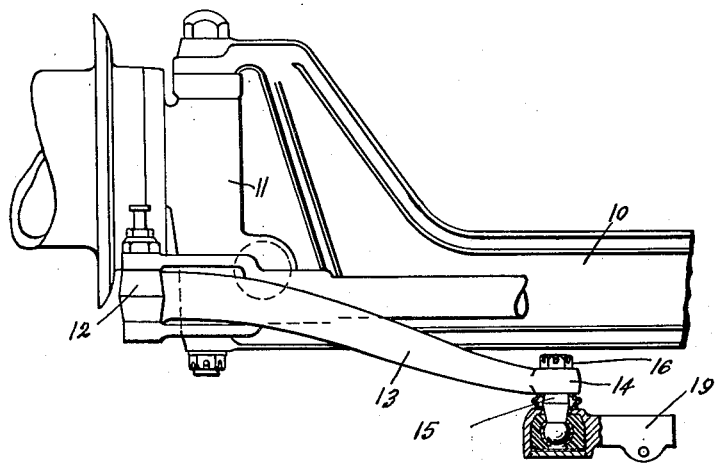
Figure 2:
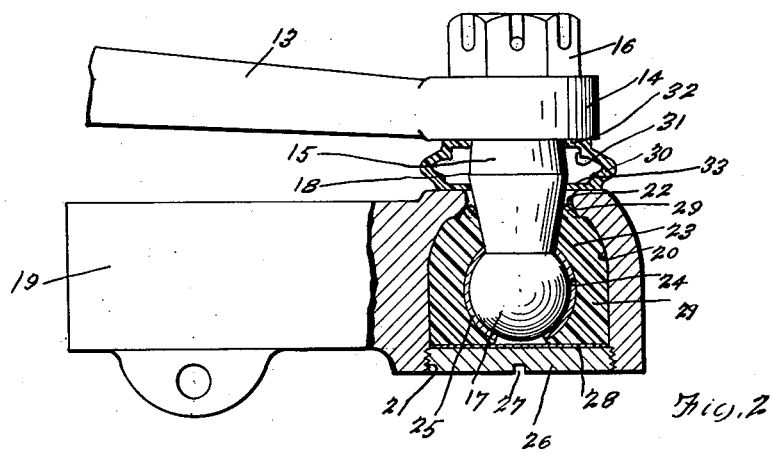

In said annexed drawing:

Fig. 1 is a broken view of a portion of a front axle and a wheel of an automotive vehicle, showing the relative location of the present joint; and Fig. 2 is an enlarged detail partly in section of such joint.

Referring more particularly to the drawing, it will be seen that in Fig. 1 there is illustrated a portion of a front axle 10 bifurcated to provide a mounting for a steering knuckle 11, said steering knuckle being provided with an arm to which is swivelled one end 12 of a lever 13, the opposite end 14 of which is formed with an eye to receive a pin 15. Said pin is secured in position by means of a nut 16 threaded thereon and is formed at its projecting end as a ball 17. As is clearly shown, said pin is tapered from substantially its midpoint 18 toward its opposite ends.

A member 19 adapted to be secured to a tie rod is formed at its free end with a socket 20 open at its one side 21 and formed with threads in said opening. The base wall of said socket 20 is formed with a bore 22, the wall of said bore being convexed, as shown, and the pin 15 is adapted to extend through said bore and into the socket 20. As is clearly shown in Fig. 2, the diameter of that portion of the pin which lies within the bore 22 is less than the diameter of said bore.

A pair of rubber blocks 23 are mounted in the socket 20, each of said blocks being formed with a semi-spherical recess 24 receiving a semi-spherical bearing member 25, said bearing members being adapted closely to surround the ball portion 17 of the pin 15.

The open side 21 of the socket 20 is adapted to be closed by a plate 26 which is threaded at its periphery for engagement with the threads 21, and which is formed with a kerf 27. A disc 28 is interposed between the plate 26 and the blocks 23. In assembling the joint, the blocks 23 and bearing members 25 are positioned on the ball 17 and the pin 15 and blocks 23 are entered into the socket 20 through the open side thereof. Thereafter, the disc 28 and the plate 26 are turned into place, and the plate 26 is turned up to compress the blocks 23. Such compression, of course, causes the rubber or similar yieldable material of the blocks 23 to flow up into the bore 22 as at 29 substantially to close said bore.

Thereafter, there is mounted on the projecting end of the pin 15 a washer 30 which is preferably formed of rubber but which may be formed of any other suitable resilient material. Said washer is formed to provide an annular recess 31 opening through the inner periphery of said washer and bounded by inwardly projecting flanges 32 and 33. The projecting end of the pin 15 is now entered in the eye of the end 14 of the lever 13 and the nut 16 is turned into place slightly to compress the washer 30. Such compression, of course, causes said washer to embrace the pin 15 very closely.

It will be seen that the washer clearly not only acts as a boot to exclude foreign matter from the interior of the socket 20, but further acts as a resilient cushion between the lever 13 and the member 19 to prevent rattling.

Other modes of applying the principle of invention may be employed instead of the one explained, change being made as regards the mechanism herein disclosed, provided the means stated by the following claim or the equivalent of such stated means be employed.

I therefore particularly point out and distinctly claim as my invention:

In a ball and socket joint adapted for limited universal movement, the combination of a socket member having a cavity provided by a bore extending therethrough constricted at one end, a shaft and ball member extending into said cavity through said constricted end, blocks of resilient material in said cavity encompassing said ball and its associated shaft and separated from each other by a plane extending through the axis of said shaft, a bushing interposed intermediately of said ball and resilient material, and means closing the other end of said cavity and forcing said blocks axially of said shaft into said constricted opening, and into close engagement with said shaft, whereby said socket is sealed against entry of foreign matter.

Signed by me, this 29th day of October, 1928.

FREDERICK H. RAGAN.